US011290870B2

(12) United States Patent
Ullah et al.

(10) Patent No.: US 11,290,870 B2
(45) Date of Patent: Mar. 29, 2022

(54) COMBINED MIGRATION AND REMIGRATION OF A NETWORK SUBSCRIPTION

(71) Applicant: Telefonaktiebolaget LM Ericsson (publ), Stockholm (SE)

(72) Inventors: Kazi Wali Ullah, Espoo (FI); Patrik Salmela, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 125 days.

(21) Appl. No.: 16/499,900

(22) PCT Filed: Apr. 13, 2017

(86) PCT No.: PCT/EP2017/058938
§ 371 (c)(1),
(2) Date: Oct. 1, 2019

(87) PCT Pub. No.: WO2018/188751
PCT Pub. Date: Oct. 18, 2018

(65) Prior Publication Data
US 2020/0120484 A1    Apr. 16, 2020

(51) Int. Cl.
| | |
|---|---|
| *H04W 4/00* | (2018.01) |
| *H04W 8/20* | (2009.01) |
| *H04W 4/60* | (2018.01) |
| *H04W 8/12* | (2009.01) |
| *H04W 8/18* | (2009.01) |

(52) U.S. Cl.
CPC ............ *H04W 8/205* (2013.01); *H04W 4/60* (2018.02); *H04W 8/12* (2013.01); *H04W 8/183* (2013.01)

(58) Field of Classification Search
CPC ......... H04W 8/205; H04W 4/60; H04W 8/12; H04W 8/183; H04W 8/20
USPC ................................................. 370/329, 330
See application file for complete search history.

(56) References Cited

U.S. PATENT DOCUMENTS

| | | | |
|---|---|---|---|
| 10,592,484 B1 * | 3/2020 | Sharma | ............... G06F 16/1774 |
| 2008/0261561 A1 | 10/2008 | Gehrmann | |
| 2015/0237496 A1 | 8/2015 | Gao et al. | |
| 2016/0088465 A1 | 3/2016 | Golla | |

(Continued)

OTHER PUBLICATIONS

International Search Report and Written Opinion dated Jul. 10, 2017 for International Application No. PCT/EP2017/058938 filed on Apr. 13, 2017, consisting of 12—pages.

(Continued)

*Primary Examiner* — Chuong T Ho
(74) *Attorney, Agent, or Firm* — Christopher & Weisberg, P.A.

(57) ABSTRACT

There are provided mechanisms for combined migration and remigration of a network subscription of a source subscriber entity. A method is performed by a profile handling unit of the source subscriber entity. The method includes initiating a combined migration and remigration of the network subscription by providing a migration start message to a migration service entity. The migration start message includes a remigration condition. The method includes accepting the network subscription to be unavailable to the source subscriber entity upon migration of the network subscription and until remigration of the network subscription back to the source subscriber entity.

18 Claims, 8 Drawing Sheets

(56) References Cited

U.S. PATENT DOCUMENTS

| | | | | |
|---|---|---|---|---|
| 2017/0289115 | A1* | 10/2017 | Lessiak | H04B 5/0031 |
| 2017/0308321 | A1* | 10/2017 | Kumagai | G06F 3/0649 |
| 2018/0004736 | A1* | 1/2018 | Zhao | H04B 1/38 |
| 2018/0255451 | A1* | 9/2018 | Fan | H04W 12/08 |
| 2019/0053040 | A1* | 2/2019 | Long | H04W 12/06 |
| 2019/0349744 | A1* | 11/2019 | Zong | H04W 80/10 |
| 2020/0076689 | A1* | 3/2020 | Chandrashekar | G06F 9/45558 |

OTHER PUBLICATIONS

GSM Association Official Document SGP .22—RSP Technical Specification; Version 2.0; pp. 1 through 229; Oct. 14, 2016, consisting of 229—pages.

EPO Communication dated Jun. 22, 2021 for Patent Application No. 17718866.1, consisting of 56—pages.

* cited by examiner

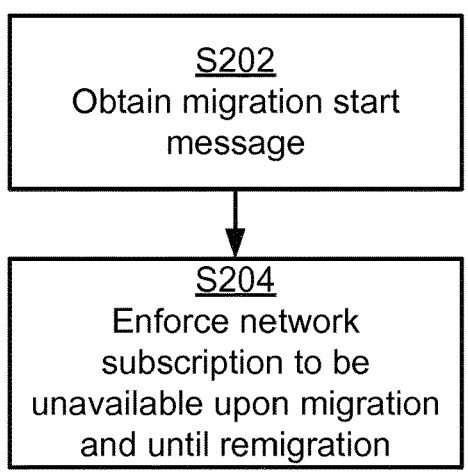
Fig. 4
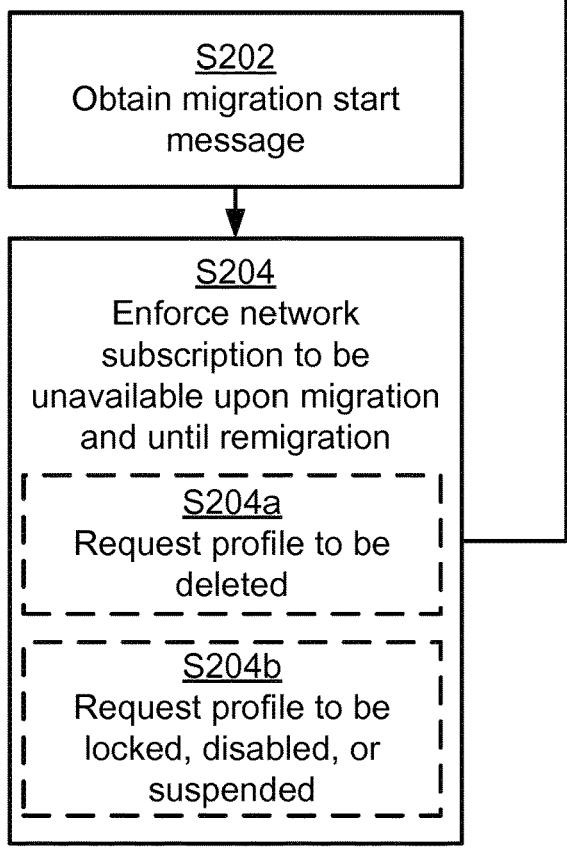
Fig. 5
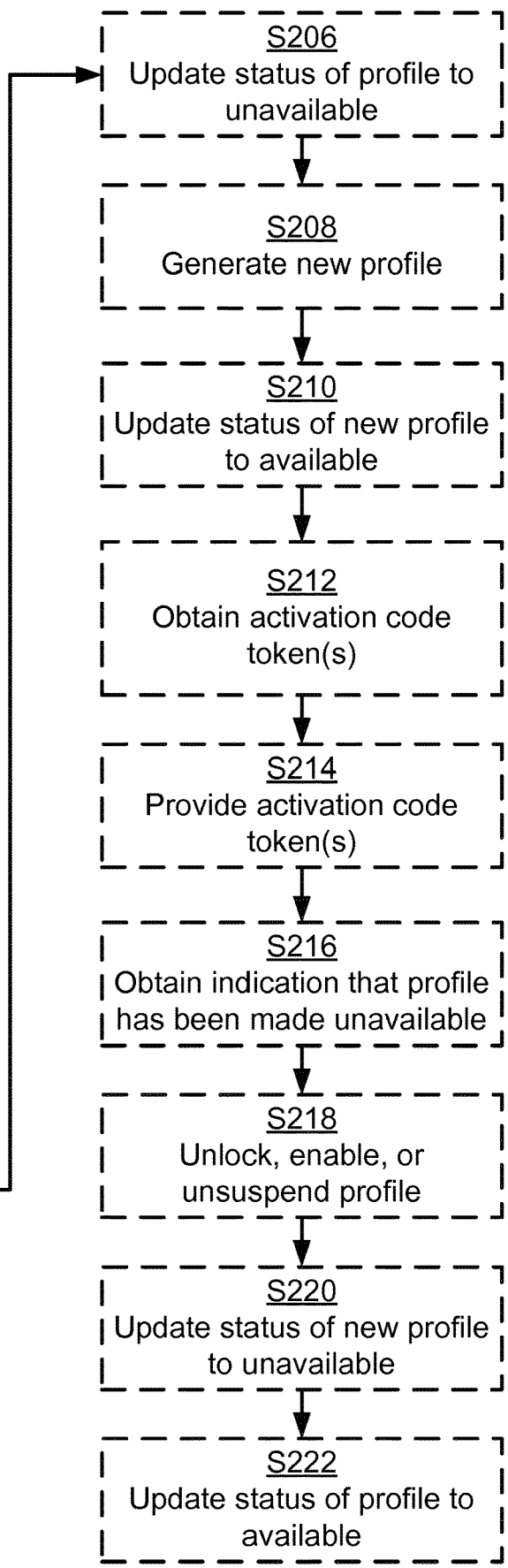

COMBINED MIGRATION AND REMIGRATION OF A NETWORK SUBSCRIPTION

CROSS-REFERENCE TO RELATED APPLICATIONS

This application is a Submission Under 35 U.S.C. § 371 for U.S. National Stage Patent Application of International Application Number: PCT/EP2017/058938, filed Apr. 13, 2017 entitled "COMBINED MIGRATION AND REMIGRATION OF A NETWORK SUBSCRIPTION," the entirety of which is incorporated herein by reference.

TECHNICAL FIELD

Embodiments presented herein relate to methods, a profile handling unit, a migration service entity, computer programs, and a computer program product for combined migration and remigration of a network subscription of a source subscriber entity.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

A subscriber identity module or subscriber identification module (SIM) is an integrated circuit chip that is intended to securely store the international mobile subscriber identity (IMSI) number and its related key, as well as other information relevant for the subscription, which is used to identify and authenticate subscriptions on the devices. The SIM circuit is part of the function of a Universal Integrated Circuit Card (UICC) physical smart card.

The GSM Association (GSMA), where GSM is short for Global System for Mobile communications, has released a technical specification denoted SGP.22-RSP defining remote SIM provisioning for consumer devices and a technical specification denoted SGP.02 disclosing a remote provisioning architecture for embedded UICC (eUICC), which targets machine-to-machine (M2M) type communications devices. In short, the operator uses an entity called SM-DP+/SM-DP (where SM-DP is short for Subscription Management-Data Preparation) for creation of SIM profiles, such as universal (U)SIM profiles, that are later installed from the SM-DP/SM-DP+ to the eUICC. For the consumer devices, the profile is installed through a Local Profile Assistant (LPA) on the consumer device to the Issuer Security Domain Profile (ISD-P) on the eUICC in the device. For the M2M devices, the SM-DP installs the profile via a separate (external) entity, SM-SR, to the ISD-P on the device.

Both above mentioned variants have the device owner obtaining a subscription for the device from the operator by providing the operator with relevant information about the device to be provisioned, optionally including eUICC ID (EID) and International Mobile Station Equipment Identity (IMEI). The subscription can be obtained from a point of sales, via a web page of the operator, or other similar methods. Section 3.1 in SGP.22 describes the profile download initiation process. It shows how the user to orders a subscription from the operator, and how the operator asks the SM-DP+ to generate the matching profile. Then the operator provides the user with an activation code (AC) that the user can insert into/provide to the device to be provisioned. The device can extract the relevant information (SM-DP+ reachability information, etc.) from the activation code and then proceed to contact the SM-DP+ for downloading the profile based on the AC after mutual authentication and various security functions.

Network subscriptions could be inflexible in terms of migration.

Hence, there is still a need for an improved handling of network subscriptions.

SUMMARY

An object of embodiments herein is to provide flexible handling of network subscriptions.

According to a first aspect there is presented a method for combined migration and remigration of a network subscription of a source subscriber entity. The method is performed by a profile handling unit of the source subscriber entity. The method comprises initiating a combined migration and remigration of the network subscription by providing a migration start message to a migration service entity. The migration start message comprises a remigration condition. The method comprises accepting the network subscription to be unavailable to the source subscriber entity upon migration of the network subscription and until remigration of the network subscription back to the source subscriber entity.

According to a second aspect there is presented a profile handling unit for combined migration and remigration of a network subscription of a source subscriber entity. The profile handling unit comprises processing circuitry. The processing circuitry is configured to cause the profile handling unit to initiate a combined migration and remigration of the network subscription by providing a migration start message to a migration service entity. The migration start message comprises a remigration condition. The processing circuitry is configured to cause the profile handling unit to accept the network subscription to be unavailable to the source subscriber entity upon migration of the network subscription and until remigration of the network subscription back to the source subscriber entity.

According to a third aspect there is presented a profile handling unit for combined migration and remigration of a network subscription of a source subscriber entity. The profile handling unit comprises processing circuitry and a storage medium. The storage medium stores instructions that, when executed by the processing circuitry, cause the profile handling unit to perform operations, or steps. The operations, or steps, cause the profile handling unit to initiate a combined migration and remigration of the network subscription by providing a migration start message to a migration service entity. The migration start message comprises a remigration condition. The operations, or steps, cause the profile handling unit to accept the network subscription to be unavailable to the source subscriber entity upon migration of the network subscription and until remigration of the network subscription back to the source subscriber entity.

According to a fourth aspect there is presented a profile handling unit for combined migration and remigration of a network subscription of a source subscriber entity. The profile handling unit comprises an initiate module configured to initiate a combined migration and remigration of the network subscription by providing a migration start message to a migration service entity. The migration start message comprises a remigration condition. The profile handling unit comprises an accept module configured accept the network subscription to be unavailable to the source subscriber entity upon migration of the network subscription and until remigration of the network subscription back to the source subscriber entity.

According to a fifth aspect there is presented a computer program for combined migration and remigration of a network subscription of a source subscriber entity. The computer program comprises computer program code which, when run on processing circuitry of a profile handling unit, causes the profile handling unit to perform a method according to the first aspect.

According to a sixth aspect there is presented a method for enabling combined migration and remigration of a network subscription of a source subscriber entity. The method is performed by a migration service entity of the source subscriber entity. The method comprises obtaining a migration start message for initiating a combined migration and remigration of the network subscription. The migration start message comprises a remigration condition. The method comprises enforcing that the network subscription is unavailable to the source subscriber entity upon migration of the network subscription and until remigration of the network subscription back to the source subscriber entity.

According to a seventh aspect there is presented a migration service entity for combined migration and remigration of a network subscription of a source subscriber entity. The migration service entity comprises processing circuitry. The processing circuitry is configured to cause the migration service entity to obtain a migration start message for initiating a combined migration and remigration of the network subscription. The migration start message comprises a remigration condition. The processing circuitry is configured to cause the migration service entity to enforce that the network subscription is unavailable to the source subscriber entity upon migration of the network subscription and until remigration of the network subscription back to the source subscriber entity.

According to an eighth aspect there is presented a migration service entity for combined migration and remigration of a network subscription of a source subscriber entity. The migration service entity comprises processing circuitry and a storage medium. The storage medium stores instructions that, when executed by the processing circuitry, cause the migration service entity to perform operations, or steps. The operations, or steps, cause the migration service entity to obtain a migration start message for initiating a combined migration and remigration of the network subscription. The migration start message comprises a remigration condition. The operations, or steps, cause the migration service entity to enforce that the network subscription is unavailable to the source subscriber entity upon migration of the network subscription and until remigration of the network subscription back to the source subscriber entity.

According to a ninth aspect there is presented a migration service entity for combined migration and remigration of a network subscription of a source subscriber entity. The migration service entity comprises an obtain module configured to obtain a migration start message for initiating a combined migration and remigration of the network subscription. The migration start message comprises a remigration condition. The migration service entity comprises an enforce module configured to enforce that the network subscription is unavailable to the source subscriber entity upon migration of the network subscription and until remigration of the network subscription back to the source subscriber entity.

According to a tenth aspect there is presented a computer program for combined migration and remigration of a network subscription of a source subscriber entity, the computer program comprising computer program code which, when run on processing circuitry of a migration service entity, causes the migration service entity to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these profile handling units, these migration service entities, and these computer programs provide flexible handling of the network subscription Advantageously these methods, these profile handling units, these migration service entities, and these computer programs enable flexibility and control regarding how to perform combined migration and remigration with the possibility to define different policies based on different remigration conditions.

Advantageously these methods, these profile handling units, these migration service entities, and these computer programs enable the remigration to be be implemented without any user interaction.

It is to be noted that any feature of the first, second, third, fourth, fifth, sixth seventh, eight, ninth, tenth and eleventh aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 2, 3, 4, and 5 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
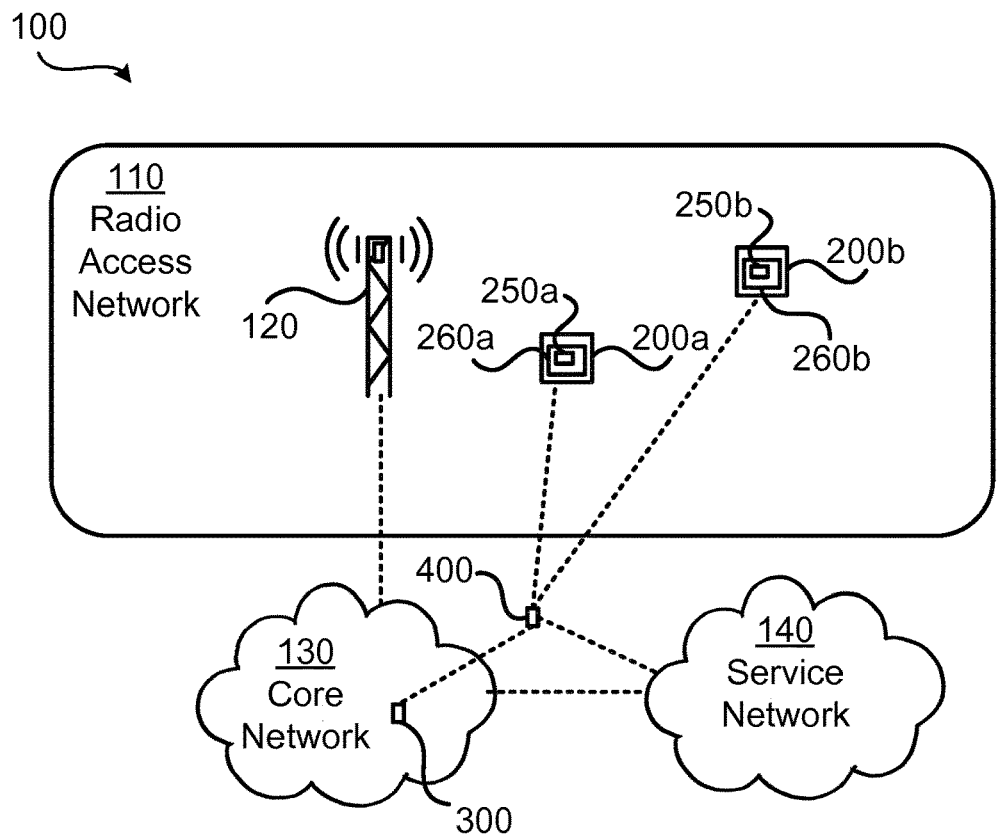
FIG. 1 is a schematic diagram illustrating a communication network according to embodiments.

FIG. 1 is a schematic simplified diagram of a communications network 100 where embodiments presented herein can be applied. The communications network 100 comprises an access network 110 (defined by an access network node 120, such as a radio base station), a core network 130, and a packet based service network 140. The core network 130 operatively connects the access network 110 with the packet based service network 140.

A subscriber entity 200a, 200b operatively connected to the packet based service network 140, for example via access network node 120, via WiFi, or via some other wireless or fixed-wired network access, is thereby enabled to access services and exchange data with the service network 140.

The subscriber entity 200a, 200b comprises a profile handling unit, which could be provided as an Issuer Security Domain Root (ISD-R) function 250a, 250b, or just ISD-R for short, and a remote subscription handling and storing unit, such as an Embedded Universal Integrated Circuit Card (eUICC), 260a, 260b. According to some aspects the ISD-R 250a, 250b is provided within the eUICC 260a, 260b. Functions of an embedded SIM (eSIM, e-SIM, or virtual SIM) circuit could be part of the function of the eUICC 260a, 260b.

At least the access network 110 and the core network 130 are operated by one or more mobile network operators (MNOs), schematically illustrated by the mobile network operator entity 400.

The communications network 100 further comprises at least one migration service entity 300. The migration service entity 300 could be located in the core network 130, in the service network 140, or outside the core network 130 and the service network 140; the herein disclosed embodiments are not limited to any particular location of the migration service entity 300.

Dotted lines in FIG. 1 indicate operational connections.

It is envisioned that a network subscription could be migrated from one of the subscriber entities to another one of the subscriber entities, say from subscriber entity 200a (acting as a source subscriber entity) to subscriber entity 200b (acting as a destination subscriber entity). The network subscription as migrated to the destination subscriber entity could be time-bounded and thus have a specific validity time, meaning that the network subscription will be terminated from the destination subscriber entity and/or from the network automatically after the validity time has expired. However, since the network subscription is terminated this procedure does not enable the network subscription to be migrated back to the source subscriber entity. Therefore, for remigration back to the source subscriber entity, the same process as for migration could be applied again but now on the destination to subscriber entity to which the network subscription has temporarily been migrated. This requires manual interaction from the user both for migration and remigration. This might not always be feasible, especially if the destination subscriber entity does not have proper user input and display capabilities.

The embodiments disclosed herein therefore relate to mechanisms for combined migration and remigration of a network subscription of a source subscriber entity 200a. In order to obtain such mechanisms there is provided a profile handling unit 250a, 260a, a method performed by the profile handling unit 250a, 260a, a computer program product comprising code, for example in the form of a computer program, that when run on processing circuitry of the profile handling unit 250a, 260a, causes the profile handling unit 250a, 260a to perform the method. In order to obtain such mechanisms there is further provided a migration service entity 300, a method performed by the migration service entity 300, and a computer program product comprising code, for example in the form of a computer program, that when run on processing circuitry of the migration service entity 300, causes the migration service entity 300 to perform the method.

Figure 2:
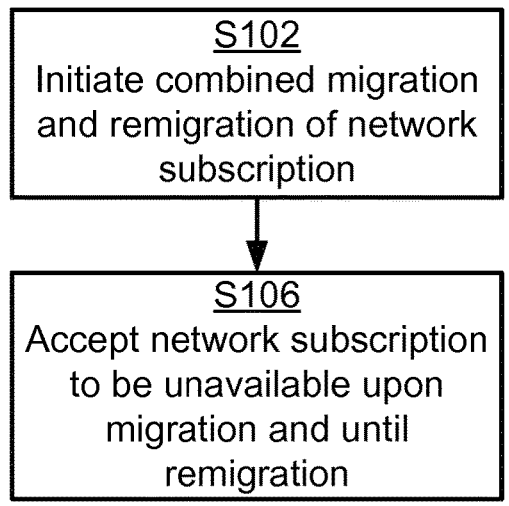
Figure 3:
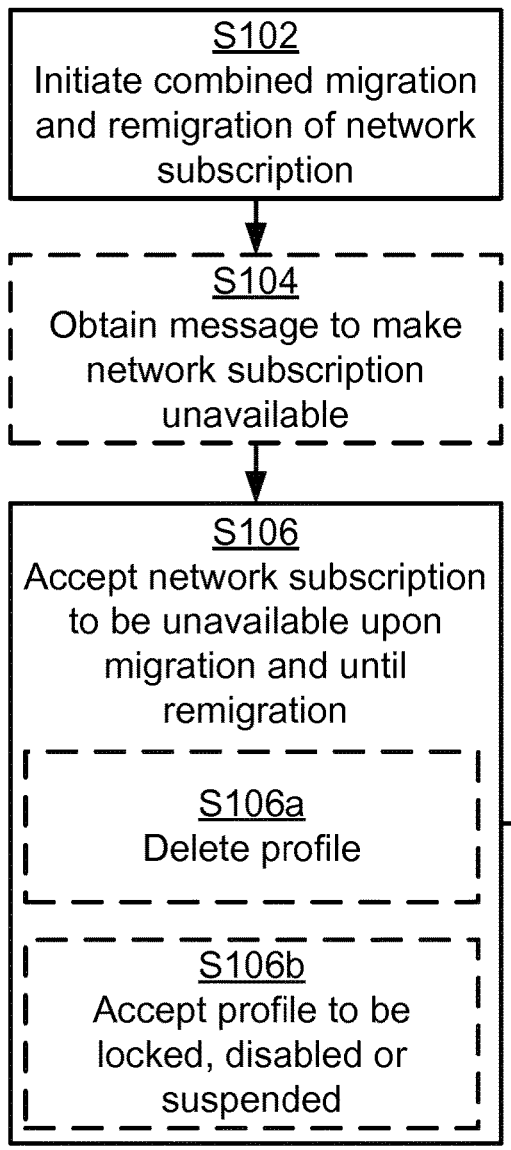

FIGS. 2 and 3 are flowcharts illustrating embodiments of methods for combined migration and remigration of a network subscription of a source subscriber entity 200a as performed by the profile handling unit 250a, 260a. FIGS. 4 and 5 are flowcharts illustrating embodiments of methods for combined migration and remigration of a network subscription of a source subscriber entity 200a as performed by the migration service entity 300. The methods are advantageously provided as computer programs 1220a, 1220b.

Reference is now made to FIG. 2 illustrating a method for combined migration and remigration of a network subscription of a source subscriber entity 200a as performed by the profile handling unit 250a, 260a of the source subscriber entity 200a according to an embodiment.

Already when the source subscriber entity 200a initiates the migration of the network subscription it also includes a condition for remigration. The condition for remigration could be set by the owner of the source subscriber entity 200a. Particularly, the profile handling unit 250a, 260a is configured to perform step S102:

S102: The profile handling unit 250a, 260a initiates a combined migration and remigration of the network subscription. The combined migration and remigration is initiated by the profile handling unit 250a, 260a providing a migration start message to a migration service entity 300. The migration start message comprises a remigration condition.

Upon migration of the network subscription (to the destination subscriber entity 200b) the network subscription is unavailable to the source subscriber entity 200a. The remigration then occurs based on the remigration condition comprised in the migration start message. Particularly, the profile handling unit 250a, 260a is configured to perform step S106:

S106: The profile handling unit 250a, 260a accepts the network subscription to be unavailable to the source subscriber entity 200a upon migration of the network subscription and until remigration of the network subscription back to the source subscriber entity 200a.

This allows the network subscription owner, such as a user, to only having to initiate the migration process, and thus removes the need for explicit initiation of the remigration process.

Embodiments relating to further details of combined migration and remigration of a network subscription of a source subscriber entity 200a as performed by the profile handling unit 250a, 260a will now be disclosed.

There could be different ways for the profile handling unit 250a, 260a to notify to which subscriber entity the network subscription is to be migrated. According to an embodiment the migration start message comprises information identifying a destination subscriber entity 200b to which the network subscription is to be migrated.

There could be different remigration conditions. Examples of remigration to conditions include, but are not limited to, an expiration time, a data usage limit, and a talk time limit. A further remigration condition could be to migrate the network subscription back to the source subscriber entity 200a if the migration fails or if the network subscription is removed, or otherwise rendered unavailable, from the destination subscriber entity 200b another remigration condition (e.g., relating to expiration time, data usage limit, or talk time limit). As will be further disclosed below, alternatively the network subscription is not made unavailable to the source subscriber entity 200a until the network subscription has been successfully migrated to the destination subscriber entity 200b.

Reference is now made to FIG. 3 illustrating methods for combined migration and remigration of a network subscription of a source subscriber entity 200a as performed by the profile handling unit 250a, 260a of the source subscriber entity 200a according to further embodiments. It is assumed that steps S102, S106 are performed as described above with reference to FIG. 2 and a thus repeated description thereof is therefore omitted.

As disclosed above, the network subscription is to be unavailable to the source subscriber entity 200a upon migration of the network subscription and until remigration of the network subscription back to the source subscriber entity 200a. In some aspects the network subscription is made unavailable to the source subscriber entity 200a before being migrated to the destination subscriber entity 200b. In other aspects this requires the network subscription to be successfully be migrated to the destination subscriber entity 200b before the network subscription is to be made unavailable to the source subscriber entity 200a. There may be different ways for the profile handling unit 250a, 260a to know when the network subscription is to be made unavailable to the source subscriber entity 200a. Particularly, according to an embodiment the profile handling unit 250a, 260a is configured to perform step S104:

S104: The profile handling unit 250a, 260a obtains a message from a to migration service entity 300 to make the network subscription unavailable to the source subscriber entity 200a in response to having initiated the combined migration and remigration. The network subscription is accepted to be unavailable to the source subscriber entity 200a in response thereto (i.e. in response to having obtained the message in step S104).

There may be different ways for the profile handling unit 250a, 260a to accept the network subscription to be unavailable in step S106 and thus for the network subscription to be made unavailable to the source subscriber entity 200a. Different embodiments relating thereto will now be described in turn.

In some aspects a profile of the network subscription is removed. Particularly, according to an embodiment the profile handling unit 250a, 260a is configured to perform step S106a as part of step S106:

S106a: The profile handling unit 250a, 260a deletes a profile of the network subscription from the source subscriber entity 200a.

In some aspects the profile of the network subscription is made unavailable to the source subscriber entity 200a in other ways than being removed. Particularly, according to an embodiment the profile handling unit 250a, 260a is configured to perform step S106b as part of step S106:

S106b: The profile handling unit 250a, 260a accepts (and makes sure that) the profile (is) to be locked, disabled, or suspended.

In some aspects an activation code token is needed for enabling access to the profile of the network subscription. Separate activation code tokens may be needed for the source subscriber entity 200a and the destination subscriber entity 200b. Particularly, according to an embodiment the profile handling unit 250a, 260a is configured to perform step S108:

S108: The profile handling unit 250a, 260a obtaining S108 a first activation code token for enabling access to the profile of the network subscription by the destination subscriber entity 200b to which the network subscription is to be migrated.

The profile handling unit 250a, 260a optionally also obtains a second activation code token for enabling access to the profile of the network subscription by the source subscriber entity 200a upon remigration to the source subscriber entity 200a. The second activation code token might only be needed when the profile of the network subscription needs to be downloaded to the source subscriber entity 200a as part of the remigration (i.e. when the profile of the network subscription was deleted from the source subscriber entity 200a as in step S106a).

In some aspects the network subscription is remigrated back to the source subscriber entity 200a when the remigration condition is met. Particularly, according to an embodiment the profile handling unit 250a, 260a is configured to perform step S110:

S110: The profile handling unit 250a, 260a remigrates the network subscription back to the source subscriber entity 200a.

There could be different ways for the profile handling unit 250a, 260a to enable remigration of the network subscription back to the source subscriber entity 200a.

In some aspects the network subscription is downloaded to and installed on the source subscriber entity 200a. Hence, according to an embodiment the profile handling unit 250a, 260a is configured to perform step S110a as part of step S110:

S110a: The profile handling unit 250a, 260a downloads and installs a profile of the network subscription from a subscription management entity.

As disclosed above, a second activation code token might be needed when the profile of the network subscription needs to be downloaded to the source subscriber entity 200a as part of the remigration. Therefore, according to an to embodiment at least one of the downloading and the installing of the profile only is allowed by the subscription management entity upon the source subscriber entity 200a providing the second activation code token to the subscription management entity.

In some aspects the network subscription is made available to the source subscriber entity 200a without being downloaded or installed. Particularly, according to an embodiment the profile handling unit 250a, 260a is configured to perform step Snob as part of step S110:

S110b: The profile handling unit 250a, 260a accepts the profile to be unlocked, enabled, or unsuspended.

Reference is now made to FIG. 4 illustrating a method for combined migration and remigration of a network subscription of a source subscriber entity 200a as performed by the migration service entity 300 of the source subscriber entity 200a according to an embodiment.

As disclosed above, the profile handling unit 250a, 260a initiates a combined migration and remigration of the network subscription by providing a migration start message to a migration service entity 300, where the migration start message comprises a remigration condition.

It is thus assumed that the migration service entity 300 obtains the migration start message. Hence, the migration service entity 300 is configured to perform step S202:

S202: The migration service entity 300 obtains a migration start message for initiating a combined migration and remigration of the network subscription. The migration start message comprises a remigration condition.

The migration service entity 300 then enforces the remigration condition. Particularly, the migration service entity 300 is configured to perform step S204:

S204: The migration service entity 300 enforces that the network subscription is unavailable to the source subscriber entity 200a upon migration of the network subscription and until remigration of the network subscription back to the source subscriber entity 200a.

Embodiments relating to further details of combined migration and remigration of a network subscription of a source subscriber entity 200a as performed by the migration service entity 300 will now be disclosed.

According to a first example the migration service entity 300 is provided in an MNO entity 400. According to a second example the migration service entity 300 is provided in an SM-DP+ entity. According to a third example the migration service entity 300 is provided in an entity having a trusted relationship with the MNO entity 400 and the SM-DP+ entity. The MNO entity 400 could thus delegate the operations as defined by the herein disclosed steps performed by the migration service entity 300 to the SM-DP+ entity. This enables the SM-DP+ entity to perform most of the operations required for migration and remigration whilst the MNO entity 400 has to be involved only to update its internal databases.

Reference is now made to FIG. 5 illustrating methods for combined migration and remigration of a network subscription of a source subscriber entity 200a as performed by the migration service entity 300 of the source subscriber entity 200a according to further embodiments. It is assumed that steps S202, S204 are performed as described above with reference to FIG. 4 and a thus repeated description thereof is therefore omitted.

As disclosed above, there may be different ways to make the network subscription to be unavailable to the source subscriber entity 200a.

In some aspects a profile of the network subscription is removed. Particularly, according to an embodiment the migration service entity 300 is configured to perform step S204a as part of enforcing that the network subscription is unavailable to the source subscriber entity 200a in step S204:

S204a: The migration service entity 300 requests the source subscriber entity 200a to delete the profile of the network subscription.

In some aspects a profile of the network subscription is not removed. Particularly, according to an embodiment the migration service entity 300 is configured to perform step S204b as part of enforcing that the network subscription is unavailable to the source subscriber entity 200a in step S204:

S204b: The migration service entity 300 requests the source subscriber entity 200a to lock, disable, or suspend the profile from being accessed by the source subscriber entity 200a.

There could be different ways for the migration service entity 300 to act upon having enforced that the network subscription is unavailable to the source subscriber entity 200a.

In some aspects the migration service entity 300 updates the status of the profile. Particularly, according to an embodiment the migration service entity 300 is configured to perform step S206 upon enforcing that the network subscription is unavailable to the source subscriber entity 200a:

S206: The migration service entity 300 updates status of the profile as being unavailable to the source subscriber entity 200a.

In this respect the status could be updated in the SM-DP+ entity (being part of the migration service entity 300). In case the migration service entity 300 is not part of the SM-DP+ entity, then the migration service entity 300 may need to inform the SM-DP+ in order to make the profile unavailable. The status is updated so that the source subscriber entity 200a is not able to download, or otherwise access, the profile again after being deleted or locked.

As disclosed above, in some aspects the network subscription is associated with a profile in the source subscriber entity 200a. A new profile could then be generated for the destination subscriber entity 200b. According to an embodiment the migration service entity 300 is therefore configured to perform steps S208 and S210 upon enforcing that the network subscription is unavailable to the source subscriber entity 200a:

S208: The migration service entity 300 generates a new profile for the destination subscriber entity 200b to which the network subscription is to be migrated. The new profile is based on the profile of the source subscriber entity 200a. In this respect the new profile could even be identical to the profile of the source subscriber entity 200a. In other aspects the new profile could even be identical to the profile of the source subscriber entity 200a except being associated with the destination subscriber entity 200b instead of the source subscriber entity 200a in terms of keys, etc.

S210: The migration service entity 300 updates status of the new profile as being available to the destination subscriber entity 200b upon enforcing that the network subscription is unavailable to the source subscriber entity 200a.

The profile could then remain unavailable to the source subscriber entity 200a when the new profile is available to the destination subscriber entity 200b.

As disclosed above, an activation code token could be needed for enabling access to the profile of the network subscription. According to an embodiment the migration service entity 300 is therefore configured to perform step S212:

S212: The migration service entity 300 obtains the first activation code token for enabling access to the profile of the network subscription by the destination subscriber entity 200b to which the network subscription is to be migrated. The migration service entity 300 optionally obtains a second activation code token for enabling access to the profile of the network subscription by the source subscriber entity 200a upon remigration to the source subscriber entity 200a. The activation codes could be generated by the migration service entity 300, by the SM-DP+ entity, or by the MNO entity 400.

Once generated, the first activation code token and the second activation code token (if generated) are provided to the source subscriber entity 200a. Hence, according to this embodiment the migration service entity 300 is configured to perform step S214:

S214: The migration service entity 300 provides the first activation code token, and, optionally, the second activation code token to the source subscriber entity 200a.

After the remigration condition is met at the destination subscriber entity 200b, the destination subscriber entity 200b deletes the network subscription and sends a notification of this deletion. The migration service entity 300 receives this notification, possibly via the SM-DP+ entity or via the MNO entity 400. Hence, according to an embodiment the migration service entity 300 is configured to perform step S216:

S216: The migration service entity 300 obtains an indication from the destination subscriber entity 200b that the network subscription has been made unavailable to the destination subscriber entity 200b.

The migration service entity 300 then makes the network subscription available to the source subscriber entity 200a again. That is, the migration service entity 300 is configured to perform step S218:

S218: The migration service entity 300 unlocks, enables, or unsuspends the profile such that the profile is made accessible to the source subscriber entity 200a.

There could be different ways for the migration service entity 300 to act upon remigration of the network subscription back to the source subscriber entity 200a. In some aspects the migration service entity 300 updates the status of the profiles. Hence, according to an embodiment the migration service entity 300 is configured to perform steps S220, S222:

S220: The migration service entity 300 updates status of the new profile as to being unavailable to the destination subscriber entity 200b.

S222: The migration service entity 300 updates status of the profile as being available to the source subscriber entity 200a. Further, also the profile parameters could be updated. For example, the key of the profile might be updated so that the key is different before migration and after remigration.

Figure 6A:
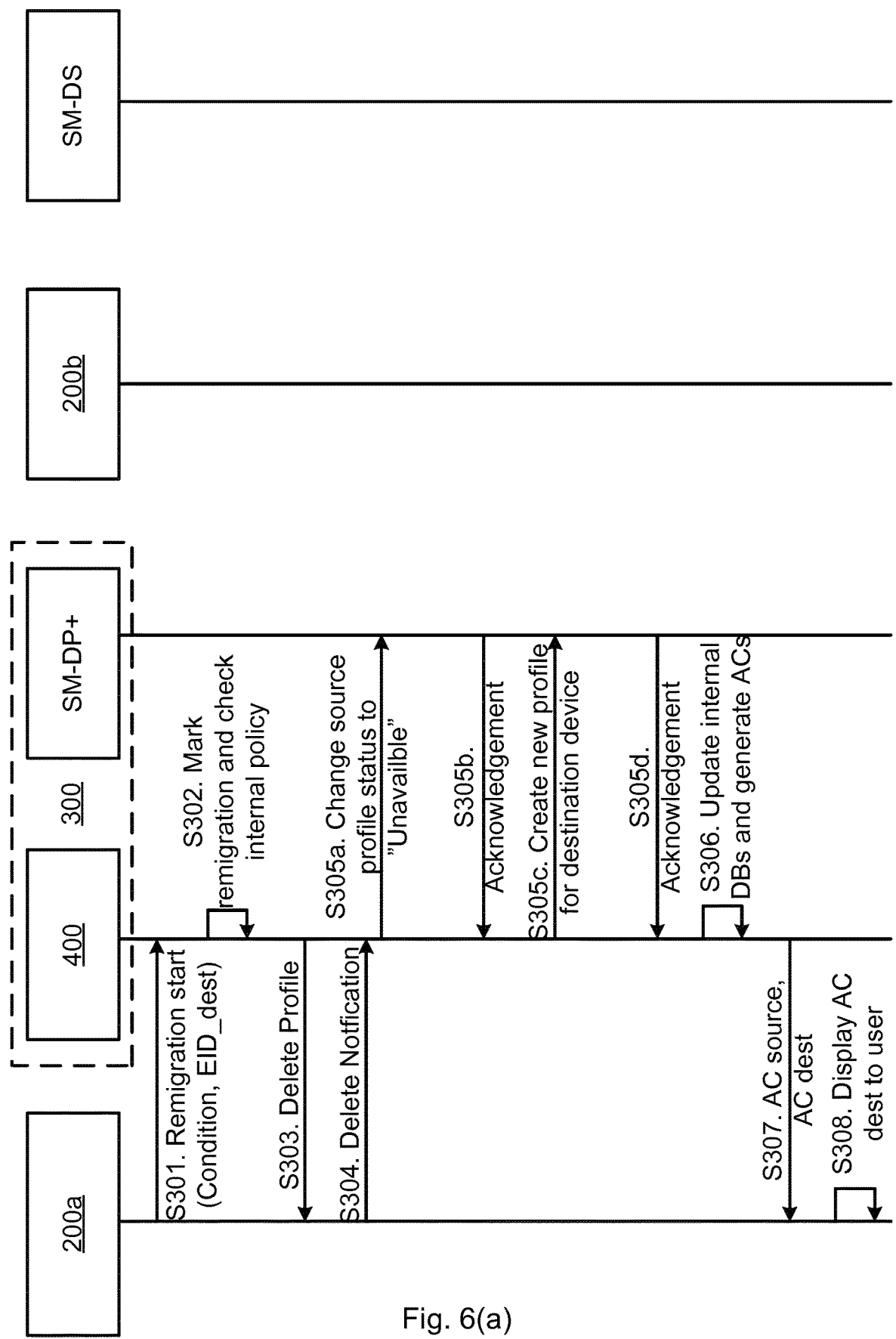
FIGS. 6 and 7 are signalling diagrams according to embodiments.
Figure 6B:
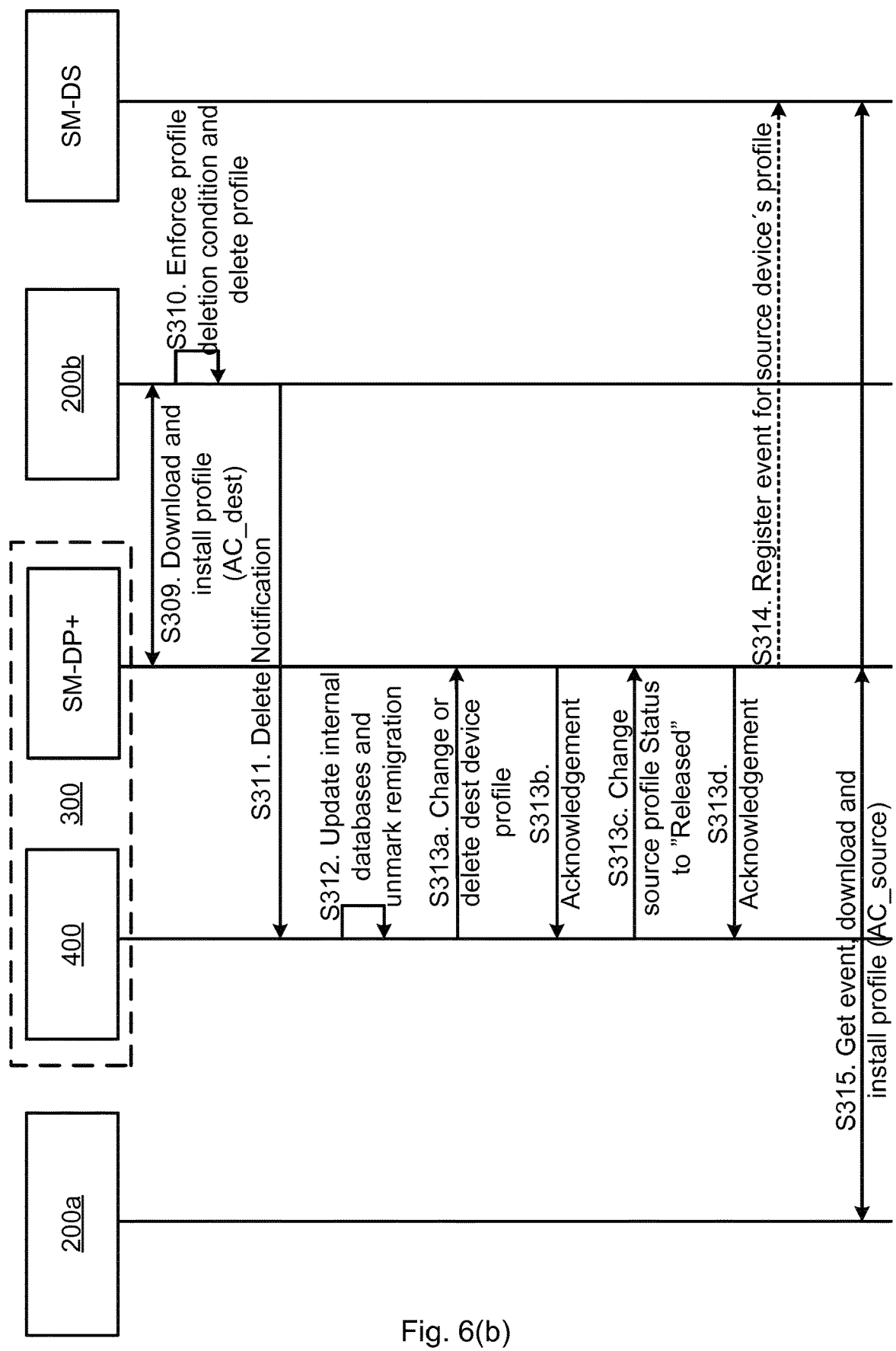

A first particular embodiment for combined migration and remigration of a network subscription of a source subscriber entity 200a as performed by the profile handling unit 250a, 260a and the migration service entity 300 based on at least some of the above disclosed embodiments will now be disclosed in detail with reference to the signalling diagram of FIG. 6.

In this first particular embodiment it is assumed that the migration service is running in the MNO entity 400. However, also the SM-DP+ entity could be a logical entity to run the migration service, or it could be run by a third party.

S301: The user starts the remigration process in the source subscriber entity 200a, which will result in the source subscriber entity 200a connecting to the migration service entity 300. This can be done using a Local Profile Assistant (LPA). The user specifies a remigration condition (e.g. expiration time, data usage limit, talk time limit, etc.). The user specifies the identity of the eUICC (EID) of the destination subscriber entity 200b so that the migration service entity 300 can create a bound profile package for the destination subscriber entity 200b.

S302: The migration service entity 300 communicates this request to the MNO entity 400, which identifies from the supplied remigration condition or the message type that this is a combined migration and remigration (i.e. it is not only a migration) and checks for internal policies whether the migration service entity 300 will allow this migration and/or whether the destination subscriber entity 200b is capable of utilizing the profile.

S303: The migration service entity 300 request deletion of the profile in the source subscriber entity 200a upon successful checks by the MNO entity 400 in step S302.

S304: The source subscriber entity 200a deletes the profile and sends the notification towards the migration service entity 300. The notification may reach the migration service entity 300 entity 400 via the SM-DP+ entity.

S305a, S305b, S305c, S305d: The MNO entity 400, after obtaining a deletion notification from the source subscriber entity 200a, changes the status of the profile of the source subscriber entity 200a in the SM-DP+ entity as "locked". This makes sure that the source subscriber entity 200a will not be able to re-download the old profile anymore even if it provides a valid activation code token. The SM-DP+ entity acknowledges to the MNO entity 400 that it has changed the status. If the SM-DP+ entity does not anymore have the profile available, the MNO entity 400 could provide the subscription information that the SM-DP+ entity can use for re-generating the original profile. Further, the MNO entity 400 requests the SM-DP+ entity to create a new bound profile package with the same subscription information but for the destination subscriber entity 200b. The migration service entity 300 could indicate if certain parameters should be updated, such as a subscription secret key. The SM-DP+ entity returns the appropriate response from which the MNO entity 400 can generate the activation code tokens for both the source subscriber entity 200a and the destination subscriber entity 200b.

The SM-DP+ entity might also generate keys for the new profile and provide the keys to the MNO entity 400. For the new profile the remigration condition is attached as metadata.

S306: The MNO entity 400 updates its internal databases for any changes in the profile. For example, while the subscription information is kept, the keys may be changed for the migrated profile. In addition, the MNO entity 300 marks the subscription to be in a remigration stage so that the MNO entity 300 will know to continue with remigration once the MNO entity 300 obtains a delete notification from the destination subscriber entity 200b. The MNO also generates the activation code tokens for both the source subscriber entity 200a (for use during remigration) and the destination subscriber entity 200b (for use during migration).

S307: The MNO entity 400 (possibly via the migration service entity 300) sends back the activation code tokens to the source subscriber entity 200a.

S308: The source subscriber entity 200a causes the activation code token of the destination subscriber entity 200b to be displayed to the user. The source subscriber entity 200a optionally causes the activation code token of the source subscriber entity 200a to be displayed to the user. The activation code token of the source subscriber entity 200a is stored for remigration.

S309: The user initiates download of the new profile to the destination subscriber entity 200b by initiating utilization of the activation code token of the destination subscriber entity 200b towards the SM-DP+ entity (possibly via the migration service entity 300).

S310: The destination subscriber entity 200b enforces the profile deletion once the remigration condition given is met, or earlier if the destination subscriber entity 200b for some other reason wants the profile to be deleted. That is, a regular delete may occur before the remigration condition is met which does not hamper the remigration process.

S311: The destination subscriber entity 200b sends a delete notification message to the MNO entity 400 (possibly via the SM-DP+ entity).

S312: The MNO entity 400, after receiving the delete notification from destination subscriber entity 200b, identifies that the subscription is marked for remigration (as in step S306 above) and starts to prepare the remigration. The MNO entity 400 updates its database (e.g. keys, EID, etc.) for the network subscription to be made available to, and used by, the source subscriber entity 200a.

S313a, S313b, S313c, S313d: The MNO entity 409 sends a request to the SM-DP+ entity to change the status of the profile of the destination subscriber entity 200b to "Unavailable" or to delete the profile entirely. The MNO entity 400 requests the SM-DP+ entity to change the status of the profile of the source subscriber entity 200a to "Released" so that the source subscriber entity 200a can download it and optionally for the SM-DP+ entity to update parameters, such as keys. The SM-DP+ entity sends acknowledgements to the MNO of the two abovementioned operations.

S314: The SM-DP+ entity registers the event of making the profile of the source subscriber entity 200a downloadable again with a subscription manager discovery service (SM-DS) entity. This event registration is optional for the time bounded profile remigration, however, for some other cases, like data usage limitation, this could be mandatory.

S315: The source subscriber entity 200a uses the activation code token received in step S307 to download and install the profile. This completes the remigration process and the user can now once again use the network subscription in the source subscriber entity 200a.

If the remigration condition is based on expiry time, then the source subscriber entity 200a from the onset (i.e. from step S301) knows when in time to use the activation code token to download the profile. Otherwise there is no way for the source subscriber entity 200a to know when the remigration condition will be met at the destination subscriber entity 200b, thus causing the destination subscriber entity 200b to delete the profile and enable the source subscriber entity 200a to download the profile again. In such cases, the source subscriber entity 200a could periodically query the SM-DS for events. Eventually, there will be an event for the source subscriber entity 200a that there is a profile to download and then the source subscriber entity 200a will use the activation code token to download the profile.

For the delete notifications disclosed in step S304 and step S311 there could be needed to have an agreement between the MNO entity 400 and the SM-DP+ entity that these notifications must be forwarded to the MNO entity.

Figure 7A:
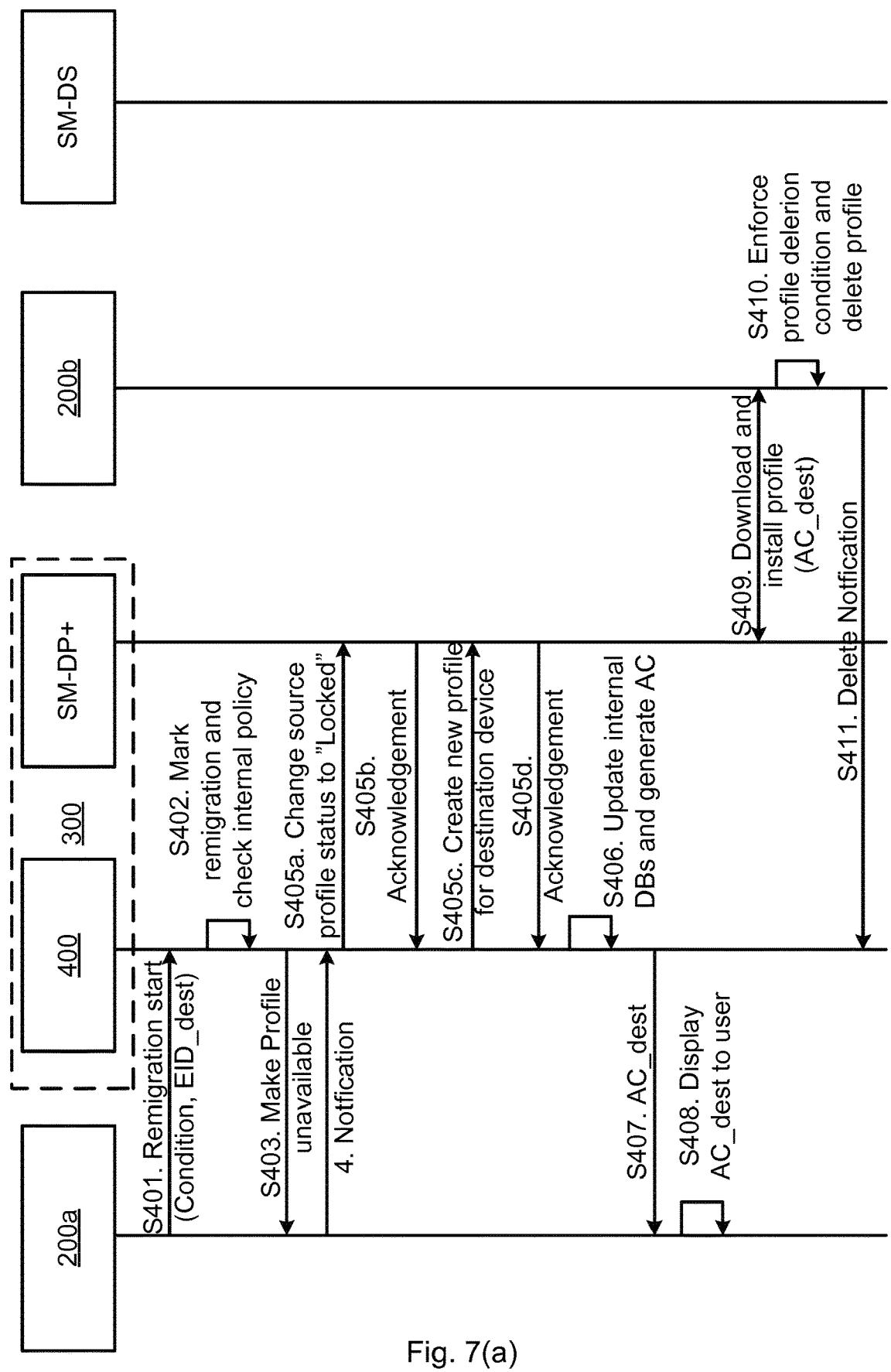
Figure 7B:
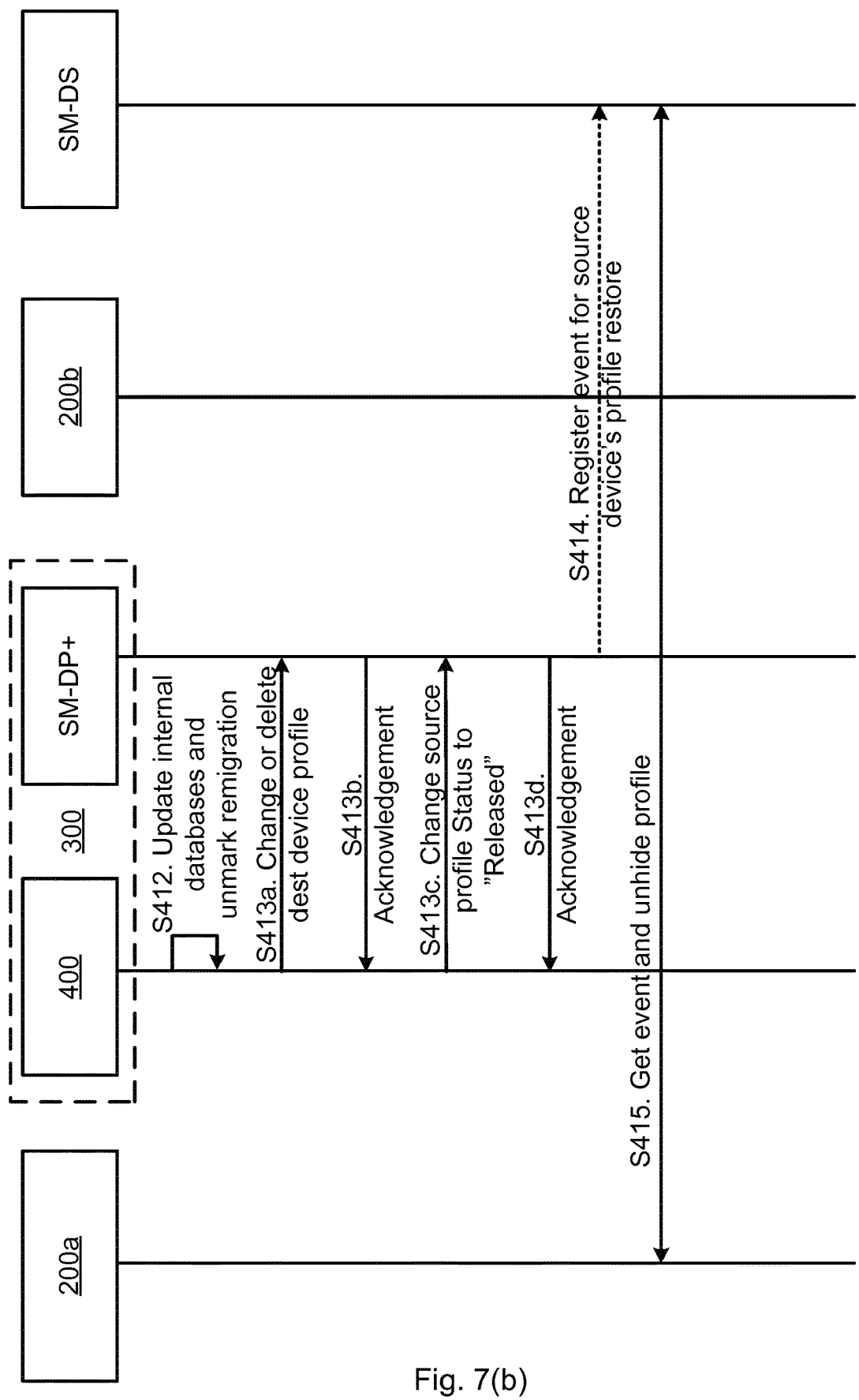

A second particular embodiment for combined migration and remigration of a network subscription of a source subscriber entity 200a as performed by the profile handling unit 250a, 260a and the migration service entity 300 based on at least some of the above disclosed embodiments will now be disclosed in detail with reference to the signalling diagram of FIG. 7.

In the second particular embodiment the profile is not removed from the source subscriber entity 200a but is otherwise made unavailable. This will allow the source subscriber entity 200a to make the profile available to the user after the remigration is completed, without having to downloading the profile again.

S401: The user starts the remigration process in the source subscriber entity 200a, which will result in the source subscriber entity 200a connecting to the migration service entity 300. This can be done using a Local Profile Assistant (LPA). The user specifies a remigration condition (e.g. expiration time, data usage limit, talk time limit, etc.). The user specifies the EID of the destination subscriber entity 200b so that the migration service entity 300 can create a bound profile package for the destination subscriber entity 200b.

S402: The migration service entity 300 communicates this request to the MNO entity 400, which identifies from the supplied remigration condition that this is a combined migration and remigration (i.e. it is not only a migration) and checks for internal policies whether the migration service entity 300 should allow this migration and/or whether the destination subscriber entity 200b is capable of utilizing the profile.

S403: The source subscriber entity 200a is by the migration service entity 300 requested to make the network subscription unavailable. In response thereto the migration service entity 300 requests the eUICC 260a of the source subscriber entity 200a to disable the network subscription and hide the profile from user's view. This can be implemented as an extended disable operation on the profile or as a hide operation. The eUICC 260a will disable the profile (if the profile is in enabled state) and mark the profile in such a way that the profile will not be accessible by the user.

S404: The source subscriber entity 200a, if configured to do so, provides a notification of this deletion. The migration service entity 300 receives this notification, possibly via the SM-DP+ entity or via the MNO entity 400. However, if the profile is already disabled beforehand, then the action from Step S403 should generate a notification. The notification provided in step S404 could be an acknowledgement stating that the operation at step S403 is performed. The notification could be provided with a cryptographic signature, or otherwise cryptographically protected, by the private key of the ISD-R/eUICC to prove that the network subscription actually is made unavailable.

S405a, S405b, S405c, S405d: The MNO entity 400, after obtaining a notification from the source subscriber entity 200a that the network subscription is made unavailable, changes the status of the profile of the source subscriber entity 200a in the SM-DP+ entity as "locked". This makes sure that the source subscriber entity 200a will not be able to access the profile. The SM-DP+ entity acknowledges to the MNO entity 400 that it has changed the status. If the SM-DP+ entity does not anymore have the profile available, the MNO entity 400 could provide the subscription information that the SM-DP+ entity can use for re-generating the original profile. Further, the MNO entity 400 requests the SM-DP+ entity to create a new bound profile package with the same subscription information but for the destination subscriber entity 200b. The MNO entity 400 could indicate if certain parameters should be updated, such as a subscription secret key. The SM-DP+ entity returns the appropriate response from which the MNO entity 400 can generate the activation code token for the destination subscriber entity 200b. The SM-DP+ entity might also generate keys for the new profile and provide the keys to the MNO entity 400. For the new profile the remigration condition is attached as metadata.

S406: The MNO entity 400 updates its internal databases for any changes in the profile. For example, while the subscription information is kept, the keys may be changed for the migrated profile. In addition, the MNO entity 300 marks the subscription to be in a remigration stage so that the MNO entity 300 will know to continue with remigration once the MNO entity 300 obtains a delete notification from the destination subscriber entity 200*b*. The MNO also generates the activation code token for the destination subscriber entity 200*b* (for use during migration).

S407: The MNO entity 400 (possibly via the migration service entity 300) sends back the activation code token to the source subscriber entity 200*a*.

S408: The source subscriber entity 200*a* causes the activation code token of the destination subscriber entity 200*b* to be displayed to the user.

S409: The user initiates download of the new profile to the destination subscriber entity 200*b* by initiating utilization of the activation code token of the destination subscriber entity 200*b* towards the SM-DP+ entity (possibly via the migration service entity 300).

S410: The destination subscriber entity 200*b* enforces the profile deletion once the remigration condition given is met or earlier if the destination subscriber entity 200*b* for some other reason wants the profile to be deleted. That is, a regular delete may occur before the remigration condition is met which does not hamper the remigration process.

S411: The destination subscriber entity 200*b* sends a delete notification message to the MNO entity 400 (possibly via the SM-DP+ entity).

S412: The MNO entity 400, after receiving the delete notification from destination subscriber entity 200*b*, identifies that the subscription is marked for remigration (as in step S406 above) and starts to prepare the remigration. The MNO entity 400 updates its database (e.g. keys, EID, etc.) for the network subscription to be made available to, and used by, the source subscriber entity 200*a*.

S413*a*, S413*b*, S413*c*, S413*d*: The MNO entity 400 sends a request to the SM-DP+ entity to change the status of the profile of the destination subscriber entity 200*b* to "Unavailable" or to delete the profile entirely. The MNO entity 400 requests the SM-DP+ entity to change the status of the profile of the source subscriber entity 200*a* to "Released" so that it can be made available to the source subscriber entity. The SM-DP+ entity sends acknowledgements to the MNO of the two abovementioned operations.

Steps S413*c* and S413*d* are optional.

S414: The SM-DP+ entity registers a new event in the SM-DS to indicate that the profile is again made available to source subscriber entity 200*a*.

S415: The source subscriber entity 200*a*, after obtaining this event from the SM-DS, is enabled to use the profile. Alternatively, the profile might be activated directly once the event is found at the SM-DS.

In summary, the user could provide a remigration condition during the migration process. This remigration condition, or a specific message type, will indicate to the migration service entity that this is not a regular migration but a migration requiring a remigration. When the remigration condition is met the network subscription will automatically be made unavailable to the destination subscriber entity 200*b* and the destination subscriber entity 200*b* will notify this to the migration service entity. After getting this notification, the migration service entity will initiate the process to make the network subscription available to the source subscriber entity 200*a* again.

Figure 8:
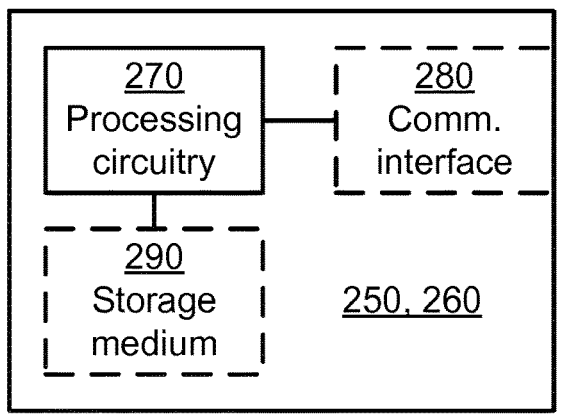
FIG. 8 is a schematic diagram showing functional units of a profile handling unit according to an embodiment.

FIG. 8 schematically illustrates, in terms of a number of functional units, the components of a profile handling unit 250*a*, 260*a* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210*a* (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the profile handling unit 250*a*, 260*a* to perform a set of operations, or steps, S102-S110*b*, as disclosed above. For example, the storage medium 230 may store the set of operations, and the processing circuitry 210 may be configured to retrieve the set of operations from the storage medium 230 to cause the profile handling unit 250*a*, 260*a* to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The profile handling unit 250*a*, 260*a* may further comprise a communications interface 220 for communications with other entities, nodes, and devices of the communications network 100. As such the communications interface 220 may comprise one or more transmitters and receivers, comprising analogue and digital components.

The processing circuitry 210 controls the general operation of the profile handling unit 250*a*, 260*a* e.g. by sending data and control signals to the communications interface 220 and the storage medium 230, by receiving data and reports from the communications interface 220, and by retrieving data and instructions from the storage medium 230. Other components, as well as the related functionality, of the profile handling unit 250*a*, 260*a* are omitted in order not to obscure the concepts presented herein.

Figure 9:
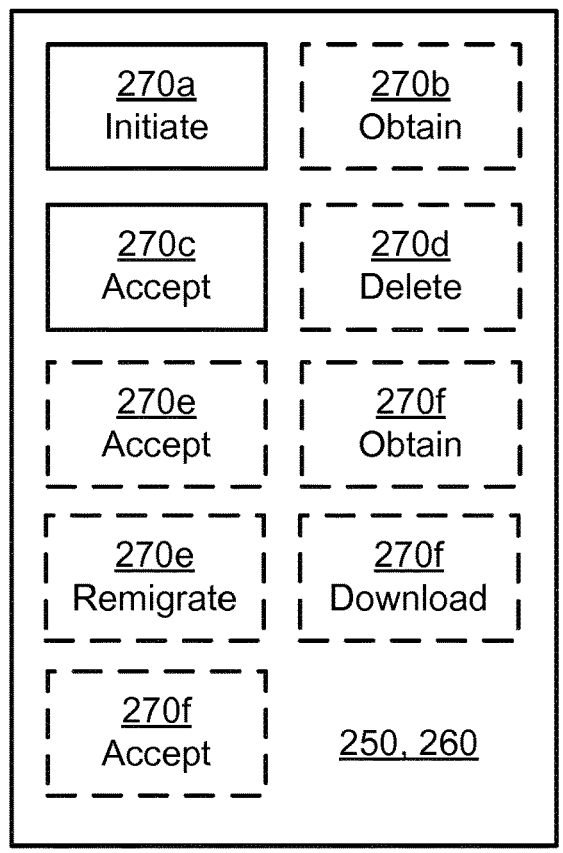
FIG. 9 is a schematic diagram showing functional modules of a profile handling unit according to an embodiment.

FIG. 9 schematically illustrates, in terms of a number of functional modules, the components of a profile handling unit 250*a*, 260*a* according to an embodiment. The profile handling unit 250*a*, 260*a* of FIG. 9 comprises a number of functional modules; an initiate module 270*a* configured to perform step S102 and an accept module 270*c* configured to perform step S106. The profile handling unit 250*a*, 260*a* of FIG. 9 may further comprise a number of optional functional modules, such as any of an obtain module 270*b* configured to perform step S104, a delete module 270*d* configured to perform step S106*a*, an accept module 270*e* configured to perform step S106*b*, an obtain module 270*f* configured to perform step S108, a remigrate module 270*e* configured to perform step S110, a download module 270*f* configured to perform step S110*a*, and an accept module 270*f* configured to perform step S110*b*. In general terms, each functional module 270*a*-270*f* may be implemented in hardware or in software. Preferably, one or more or all functional modules 270*a*-270*f* may be implemented by the processing circuitry 210, possibly in cooperation with the communications interface 220 and/or the storage medium 230. The processing circuitry 210 may thus be arranged to from the storage medium 230 fetch instructions as provided by a functional module 270*a*-270*f* and to execute these instructions, thereby performing any steps of the profile handling unit 250*a*, 260*a* as disclosed herein.

The profile handling unit 250*a*, 260*a* may be provided as a standalone device or as a part of at least one further device.

For example, the profile handling unit 250a, 260a may be provided in a subscriber entity 200a.

Figure 10:
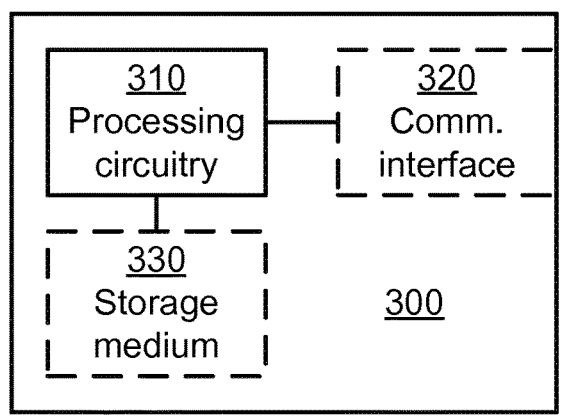
FIG. 10 is a schematic diagram showing functional units of a migration service entity according to an embodiment.

FIG. 10 schematically illustrates, in terms of a number of functional units, the components of a migration service entity 300 according to an embodiment.

Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the migration service entity 300 to perform a set of operations, or steps, S202-S222, as disclosed above. For example, the storage medium 330 may store the set of operations, and the processing circuitry 310 may be configured to retrieve the set of operations from the storage medium 330 to cause the migration service entity 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The migration service entity 300 may further comprise a communications interface 320 for communications with other entities, nodes, and devices of the communications network 100. As such the communications interface 320 may comprise one or more transmitters and receivers, comprising analogue and digital components.

The processing circuitry 310 controls the general operation of the migration service entity 300 e.g. by sending data and control signals to the communications interface 320 and the storage medium 330, by receiving data and reports from the communications interface 320, and by retrieving data and instructions from the storage medium 330. Other components, as well as the related functionality, of the migration service entity 300 are omitted in order not to obscure the concepts presented herein.

Figure 11:
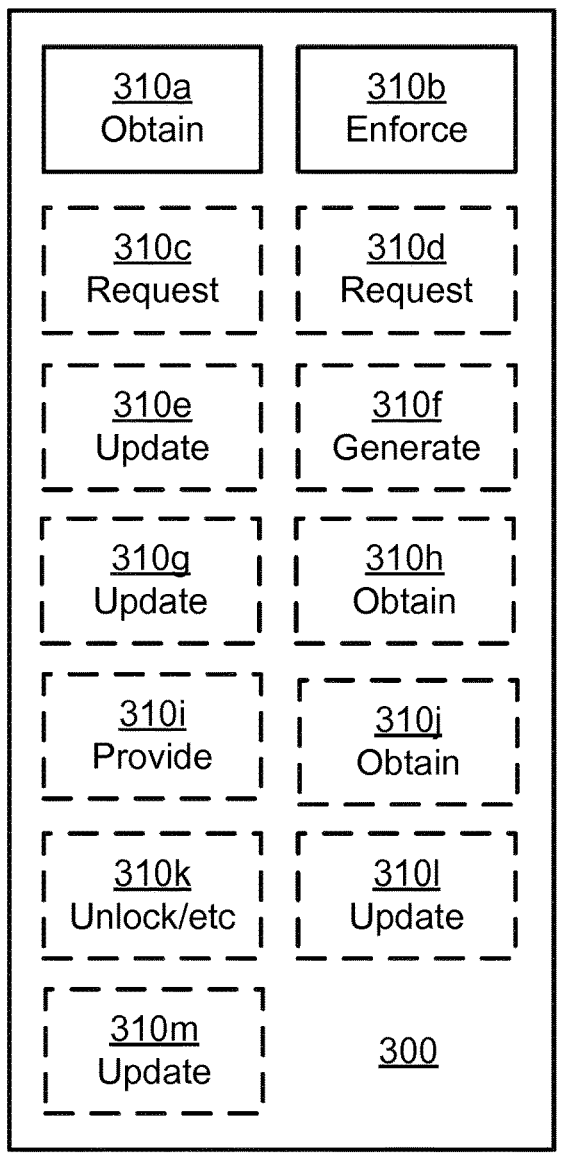
FIG. 11 is a schematic diagram showing functional modules of a migration service entity according to an embodiment.

FIG. 11 schematically illustrates, in terms of a number of functional modules, the components of a migration service entity 300 according to an embodiment. The migration service entity 300 of FIG. 11 comprises a number of functional modules; an obtain module 310a configured to perform step S202, and an enforce module 310b configured to perform step S204. The migration service entity 300 of FIG. 11 may further comprise a number of optional functional modules, such as any of a request module 310c configured to perform step S204a, a request module 310d configured to perform step S204b, an update module 310e configured to perform step S206, a generate module 310f configured to perform step S208, and update module 310g configured to perform step S210, an obtain module 310h configured to perform step S212, a provide module 310i configured to perform step S214, an obtain module 310j configured to perform step S216, an unlock/enable/unsuspend module 310k configured to perform step S218, an update module 310l configured to perform step S220, and an update module 310m configured to perform step S222. In general terms, each functional module 310a-310m may be implemented in hardware or in software. Preferably, one or more or all functional modules 310a-310m may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310m and to execute these instructions, thereby performing any steps of the migration service entity 300 as disclosed herein.

The migration service entity 300 may be provided as a standalone device or as a part of at least one further device. For example, the subscription migration service 300 may be provided in a node of the service network or in a node of the core network. Alternatively, functionality of the subscription migration service 300 may be distributed between at least two devices, or nodes. These at least two nodes, or devices, may either be part of the same network part (such as the service network or the core network) or may be spread between at least two such network parts.

Thus, a first portion of the instructions performed by the migration service entity 300 may be executed in a first device, and a second portion of the of the instructions performed by the migration service entity 300 may be executed in a second device; the herein disclosed embodiments are not limited to any particular number of devices on which the instructions performed by the migration service entity 300 may be executed. Hence, the methods according to the herein disclosed embodiments are suitable to be performed by a migration service entity 300 residing in a cloud computational environment. Therefore, although a single processing circuitry 310 is illustrated in FIG. 10 the processing circuitry 310 may be distributed among a plurality of devices, or nodes. The same applies to the functional modules 310a-310m of FIG. 11 and the computer program 1220b of FIG. 12 (see below).

Figure 12:
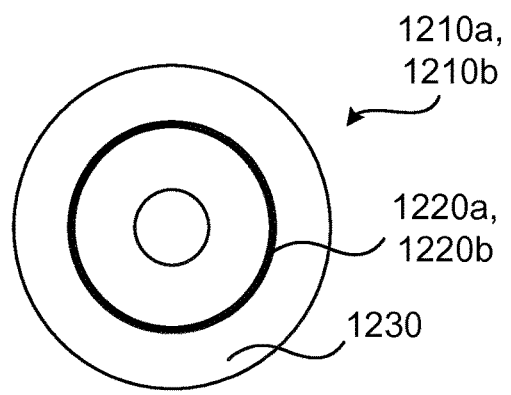
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the profile handling unit 250a, 260a as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the migration service entity 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for combined migration and remigration of a network subscription of a source subscriber entity, the method being performed by a profile handling unit of the source subscriber entity, the method comprising:
   initiating a combined migration from the source subscriber entity and remigration back to the source subscriber entity of the network subscription by providing a migration start message to a migration service entity, the migration start message comprising a remigration condition;
   accepting the network subscription to be unavailable to the source subscriber entity upon migration of the network subscription and until remigration of the network subscription back to the source subscriber entity; and
   obtaining a first activation code token for enabling access to a profile of the network subscription by a destination subscriber entity to which the network subscription is to be migrated, and a second activation code token for enabling access to the profile of the network subscription by the source subscriber entity upon remigration to the source subscriber entity.

2. The method according to claim 1, wherein the migration start message comprises information identifying a destination subscriber entity to which the network subscription is to be migrated.

3. The method according to claim 1, further comprising:
   obtaining a message from a migration service entity to make the network subscription unavailable to the source subscriber entity in response to having initiated the combined migration and remigration, and wherein the network subscription is accepted to be unavailable to the source subscriber entity in response thereto.

4. The method according to claim 1, wherein accepting the network subscription to be unavailable comprises one of:
   deleting a profile of the network subscription from the source subscriber entity; and
   accepting the profile to be one of locked, disabled, and suspended.

5. The method according to claim 1, wherein the remigration condition pertains to at least one of an expiration time, a data usage limit, and a talk time limit.

6. The method according to claim 1, further comprising:
   remigrating the network subscription back to the source subscriber entity by one of:
      downloading and installing a profile of the network subscription from a subscription management entity; and
      accepting the profile to be one of unlocked, enabled, and unsuspended.

7. The method according to claim 1, wherein at least one of the downloading and the installing of the profile only is allowed by the subscription management entity upon the source subscriber entity providing the second activation code token to the subscription management entity.

8. A method for enabling combined migration and remigration of a network subscription of a source subscriber entity, the method being performed by a migration service entity of the source subscriber entity, the method comprising:
   obtaining a migration start message for initiating a combined migration from the source subscriber entity and remigration back to the source subscriber entity of the network subscription, the migration start message comprising a remigration condition;
   enforcing that the network subscription is unavailable to the source subscriber entity upon migration of the network subscription and until remigration of the network subscription back to the source subscriber entity; and
   obtaining a first activation code token for enabling access to a profile of the network subscription by a destination subscriber entity to which the network subscription is to be migrated, and a second activation code token for enabling access to the profile of the network subscription by the source subscriber entity upon remigration to the source subscriber entity.

9. The method according to claim 8, wherein enforcing that the network subscription is unavailable to the source subscriber entity comprises one of:
   requesting the source subscriber entity to delete a profile of the network subscription; and
   requesting the source subscriber entity to one of lock, disable, and suspend the profile from being accessed by the source subscriber entity.

10. The method according to claim 9, wherein the profile remains unavailable to the source subscriber entity when the new profile is available to the destination subscriber entity.

11. The method according to claim 9, further comprising:
   obtaining an indication from a destination subscriber entity that the network subscription has been made unavailable to the destination subscriber entity; and
   one of unlocking, enabling, and unsuspending the profile such that the profile is made accessible to the source subscriber entity.

12. The method according to claim 8, further comprising, upon enforcing that the network subscription is unavailable to the source subscriber entity:
   updating status of the profile as being unavailable to the source subscriber entity.

13. The method according to claim 8, wherein the network subscription is associated with a profile in the source subscriber entity, the method further comprising, upon enforcing that the network subscription is unavailable to the source subscriber entity:
   generating a new profile for a destination subscriber entity to which the network subscription is to be migrated, wherein the new profile is based on the profile of the source subscriber entity; and
   updating status of the new profile as being available to the destination subscriber entity upon enforcing that the network subscription is unavailable to the source subscriber entity.

14. The method according to claim 13, further comprising, upon remigration of the network subscription back to the source subscriber entity:
   updating status of the new profile as being unavailable to the destination subscriber entity; and
   updating status of the profile as being available to the source subscriber entity.

15. The method according to claim 8, further comprising:
   providing the first activation code token to the source subscriber entity.

16. The method according to claim 8, wherein the migration service entity is provided in one of:
  a mobile network operator, MNO, entity, in a subscription manager data preparation, SM-DP+, entity; and
  an entity having a trusted relationship with the MNO entity and the SM-DP+ entity.

17. A profile handling unit for combined migration and remigration of a network subscription of a source subscriber entity, the profile handling unit comprising:
  processing circuitry; and
  a storage medium storing instructions that, when executed by the processing circuitry, cause the profile handling unit to:
    initiate a combined migration from the source subscriber entity and remigration back to the source subscriber entity of the network subscription by providing a migration start message to a migration service entity, the migration start message comprising a remigration condition;
    accept the network subscription to be unavailable to the source subscriber entity upon migration of the network subscription and until remigration of the network subscription back to the source subscriber entity; and
    obtain a first activation code token for enabling access to a profile of the network subscription by a destination subscriber entity to which the network subscription is to be migrated, and a second activation code token for enabling access to the profile of the network subscription by the source subscriber entity upon remigration to the source subscriber entity.

18. A migration service entity for combined migration and remigration of a network subscription of a source subscriber entity, the migration service entity comprising:
  processing circuitry; and
  a storage medium storing instructions that, when executed by the processing circuitry, cause the migration service entity to:
    obtain a migration start message for initiating a combined migration from the source subscriber entity and remigration back to the source subscriber entity of the network subscription, the migration start message comprising a remigration condition;
    enforce that the network subscription is unavailable to the source subscriber entity upon migration of the network subscription and until remigration of the network subscription back to the source subscriber entity; and
    obtain a first activation code token for enabling access to a profile of the network subscription by a destination subscriber entity to which the network subscription is to be migrated, and a second activation code token for enabling access to the profile of the network subscription by the source subscriber entity upon remigration to the source subscriber entity.

* * * * *